US008878117B2

(12) United States Patent
Ogushi

(10) Patent No.: US 8,878,117 B2
(45) Date of Patent: Nov. 4, 2014

(54) IMAGE SENSOR AND IMAGE CAPTURE APPARATUS

(75) Inventor: Naoto Ogushi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 13/517,862

(22) Filed: Jun. 14, 2012

(65) Prior Publication Data

US 2013/0001402 A1 Jan. 3, 2013

(30) Foreign Application Priority Data

Jun. 29, 2011 (JP) ................................. 2011-144551
May 28, 2012 (JP) ................................. 2012-121391

(51) Int. Cl.
| | | |
|---|---|---|
| H01L 27/146 | (2006.01) | |
| H04N 5/347 | (2011.01) | |
| H04N 5/378 | (2011.01) | |
| H04N 5/345 | (2011.01) | |
| H04N 5/357 | (2011.01) | |

(52) U.S. Cl.
CPC ............... *H04N 5/347* (2013.01); *H04N 5/378* (2013.01); *H04N 5/3456* (2013.01); *H04N 5/3575* (2013.01)
USPC ...................................................... 250/208.1

(58) Field of Classification Search
CPC ....... H01L 31/00; G02F 1/133; G02F 1/1362; G02F 9/30
USPC ................. 250/208.1; 257/290–292; 345/207
See application file for complete search history.

(56) References Cited

U.S. PATENT DOCUMENTS

| | | | |
|---|---|---|---|
| 4,996,413 A | | 2/1991 | McDaniel et al. |
| 2002/0031038 A1* | | 3/2002 | Honda et al. ............. 365/230.03 |
| 2002/0036942 A1* | | 3/2002 | Ooishi ......................... 365/226 |
| 2003/0086295 A1* | | 5/2003 | Honda et al. ............. 365/185.13 |
| 2011/0047325 A1* | | 2/2011 | Mishima ....................... 711/103 |

FOREIGN PATENT DOCUMENTS

| | | |
|---|---|---|
| JP | 2005-078135 | 10/2005 |
| JP | 2005-278135 | 10/2005 |
| JP | 2010-245951 | 10/2010 |

* cited by examiner

*Primary Examiner* — Seung C Sohn
(74) *Attorney, Agent, or Firm* — Cowan, Liebowitz & Latman, P.C.

(57) ABSTRACT

An image sensor includes pixel sections corresponding to unit pixels, a column signal line arranged for each column of the pixel sections, a row scanning circuit which selects the pixel sections for each row and transfers an analog signal to the column signal line, a column amplifier which amplifies the analog signal, an A/D converter which converts the analog signal into a digital signal for each column, a column scanning circuit which outputs the signal converted into the digital signal to a horizontal signal line, and a digital adder which adds the digital signals. The column amplifier adds the signals output from the pixel sections to the column signal line. The column scanning circuit outputs digitized signals of a plurality of columns. The digital adder adds the signals of the plurality of columns.

24 Claims, 5 Drawing Sheets

INPUT TO CDS CIRCUIT

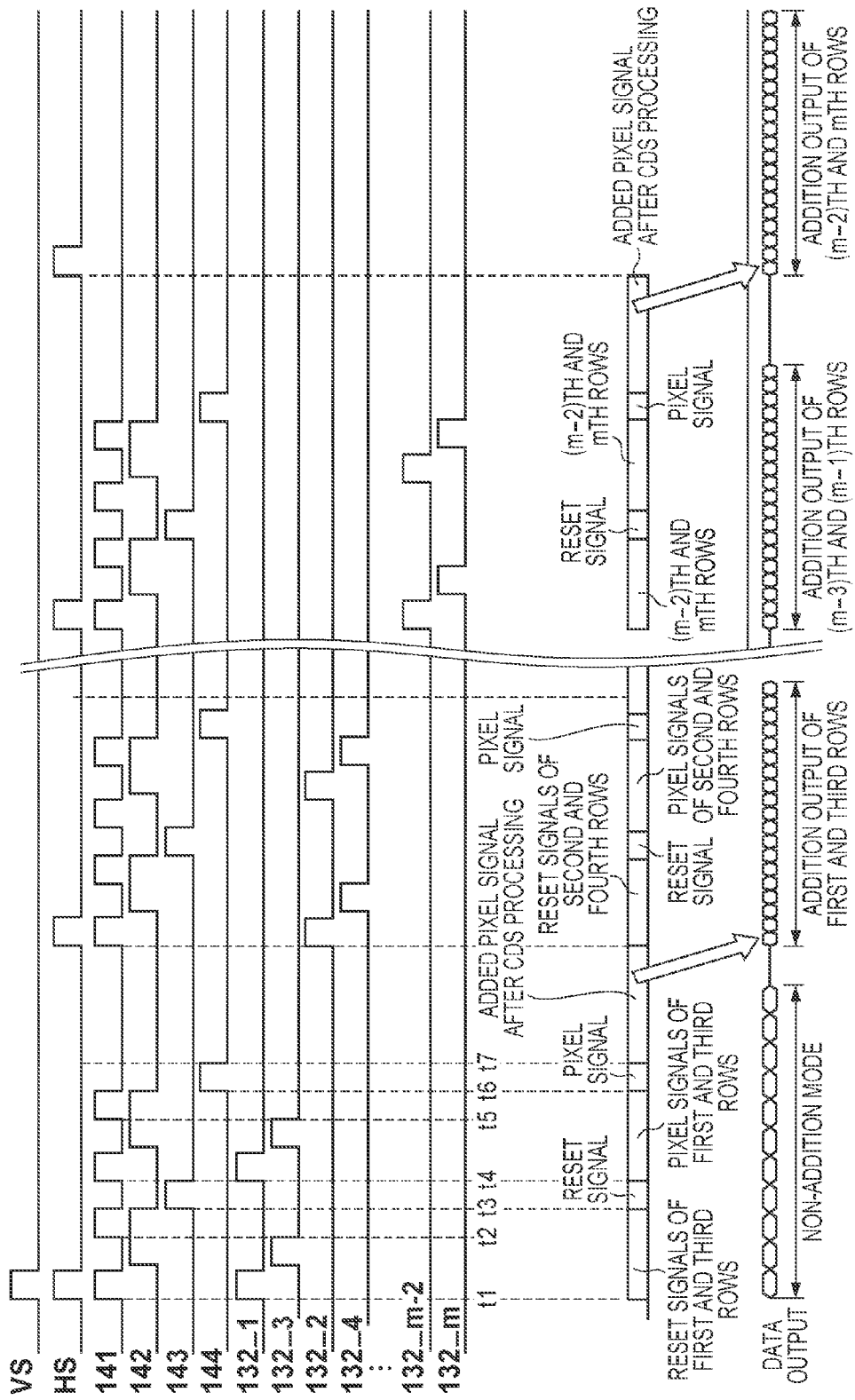

IMAGE SENSOR AND IMAGE CAPTURE APPARATUS

BACKGROUND OF THE INVENTION

1. Field of the Invention

The present invention relates to an image sensor and an image capture apparatus which have a pixel signal addition function.

2. Description of the Related Art

Along with the recent size reduction of pixels in an image sensor, the light receiving area per pixel is becoming smaller, and the amount of receivable light is decreasing. For this reason, the S/N ratio of the pixel value output from one pixel tends to be lower. Various techniques have been developed to implement a high S/N ratio by forming a structure for adding the pixel values of pixels even if an image sensor has finer pixels.

For example, Japanese Patent Laid-Open No. 2010-245951 discloses a method of adding pixel signals as analog signals for each column and appropriately switching transistors, thereby averaging charges from a plurality of pixels. On the other hand, Japanese Patent Laid-Open No. 2005-278135 discloses a method of causing an analog/digital conversion (A/D conversion) unit provided for each column to add digital signals by digital arithmetic processing.

However, in the related art disclosed in Japanese Patent Laid-Open No. 2010-245951 described above, horizontal addition is done for each column connected to the averaging unit. It is therefore impossible to perform addition for each arbitrary column because of the circuit arrangement. In the related art disclosed in Japanese Patent Laid-Open No. 2005-278135, digital addition is performed during digital arithmetic processing of the A/D conversion unit. For this reason, performing digital conversion processing for each pixel undesirably makes the conversion period longer as compared to an arrangement without addition. In addition, since vertical addition (row-direction addition) is performed after digital conversion processing of pixel signals, a line memory is needed, resulting in a larger circuit scale.

SUMMARY OF THE INVENTION

The present invention provides an image sensor and an image capture apparatus, which can perform addition processing for each arbitrary pixel and shorten the digital conversion processing period while suppressing the circuit scale.

According to a first aspect of the present invention, there is provided an image sensor comprising pixel sections each including a photoelectric conversion element which converts incident light into charges, the pixel sections corresponding to unit pixels which are two-dimensionally arranged in a row direction and a column direction and generate analog signals corresponding to the charges, a column signal line configured to output the analog signals generated in the pixel sections in the column direction, a first addition unit which adds, in the column direction, analog signals of a plurality of rows output to the column signal line, an A/D converter which converts the analog signal amplified by a column amplifier into a digital signal for each column, a row signal line configured to output the digital signal converted by the A/D converter in the row direction, and a second addition unit which adds, in the row direction, digital signals of a plurality of columns output to the row signal line.

According to a second aspect of the present invention, there is provided an image capture apparatus comprising an image sensor including pixel sections each including a photoelectric conversion element which converts incident light into charges, the pixel sections corresponding to unit pixels which are two-dimensionally arranged in a row direction and a column direction and generate analog signals corresponding to the charges, a column signal line configured to output the analog signals generated in the pixel sections in the column direction, a first addition unit which adds, in the column direction, analog signals of a plurality of rows output to the column signal line, an A/D converter which converts the analog signal amplified by a column amplifier into a digital signal for each column, a row signal line configured to output the digital signal converted by the A/D converter in the row direction, a second addition unit which adds, in the row direction, digital signals of a plurality of columns output to the row signal line, and a first scanning unit which reads analog signals generated in the pixel sections of an arbitrary row to the column signal line; a driving unit which drives the image sensor; a signal processing unit which performs predetermined signal processing for an output signal of the image sensor; and a control unit which controls the driving unit and the signal processing unit, wherein the control unit controls the driving unit by one of addition driving in which addition by the first addition unit and the second addition unit is performed and non-addition driving in which addition by the first addition unit and the second addition unit is not performed.

Further features of the present invention will become apparent from the following description of exemplary embodiments with reference to the attached drawings.

BRIEF DESCRIPTION OF THE DRAWINGS

FIG. 6 is a timing chart showing a pixel addition timing.

DESCRIPTION OF THE EMBODIMENTS

An embodiment of the present invention will now be described in detail with reference to the accompanying drawings.

Figure 1:
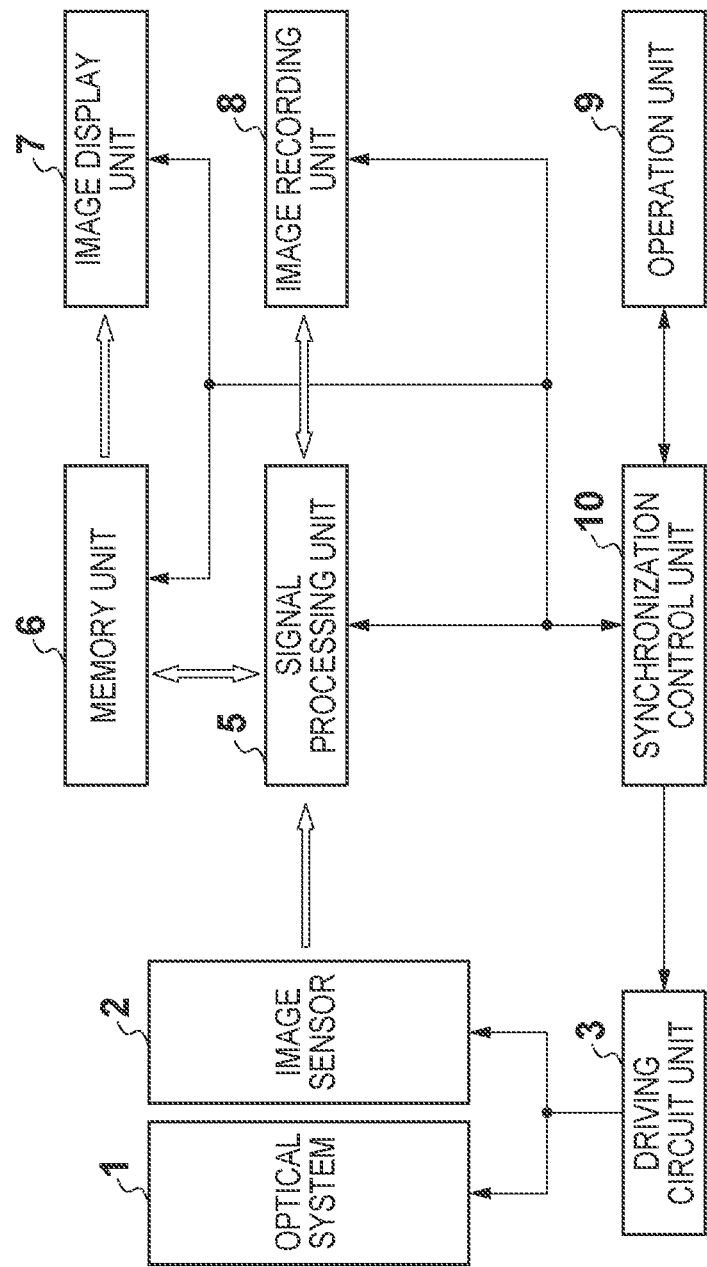
FIG. 1 is a block diagram of an image capture apparatus according to an embodiment of the present invention.

FIG. 1 is a block diagram showing the arrangement of an image capture apparatus according to the embodiment of the present invention. This image capture apparatus is implemented by an electronic still camera having a moving image function, a video camera, or the like, and includes an image sensor having an enormous number of pixels, an image display unit capable of displaying an image obtained by the image sensor, and an image recording unit capable of recording the image.

Referring to FIG. 1, the image capture apparatus of this embodiment includes an optical system 1, an image sensor 2, a driving circuit unit 3, a preprocessing unit 4, a signal processing unit 5, a memory unit 6 for storing image data, an image display unit 7, an image recording unit 8, an operation unit 9, and a synchronization control unit 10.

The optical system 1 includes an in-focus lens that forms an object image on the image sensor 2, a zoom lens that performs optical zooming, a stop that adjusts the brightness of the object image, and a shutter that controls exposure. These components are driven by the driving circuit unit 3.

The image sensor 2 includes a plurality of pixels (unit pixels) arranged on its light receiving surface in a matrix (two-dimensional pattern) of M rows×N columns in the row and column directions, and a circuit that outputs signals read from these pixels in a predetermined order. Details will be described later with reference to FIG. 2.

The driving circuit unit 3 supplies a constant voltage or a pulse for enhancing the driving capability in accordance with a control signal from the synchronization control unit 10, thereby driving the optical system 1 and the image sensor 2. The driving circuit unit 3 also has a function of transmitting the control signal from the synchronization control unit 10 to the image sensor 2.

The signal processing unit 5 is controlled by a control signal from the synchronization control unit 10 to perform appropriate signal processing for the output signal of the image sensor 2 and convert it into image data. The signal processing unit 5 also outputs image data or an output signal converted into a digital signal to the memory unit 6 or the image recording unit 8. The signal processing unit 5 also receives image data or an output signal converted into a digital signal from the memory unit 6 or the image recording unit 8 and performs signal processing. The signal processing unit 5 also has a function of detecting photometric data such as an in-focus state or an exposure amount from the output signal of the image sensor 2 and sending the data to the synchronization control unit 10.

The memory unit 6 is controlled by a control signal from the synchronization control unit 10 to temporarily store the output signal of the image sensor 2, which is converted into a digital signal, or image data that has undergone signal processing. The memory unit 6 also has a function of outputting image data for display to the image display unit 7.

The image display unit 7 is controlled by a control signal from the synchronization control unit 10 to display image data for display stored in the memory unit 6 for composition determination before photographing or image check after photographing, and is formed from an electronic viewfinder (EVF) or a liquid crystal display (LCD). The image display unit 7 generally uses a device having display pixels less than the vertical pixels of the image sensor 2. In this embodiment as well, the number of display pixels of the image display unit 7 is smaller than the number of output pixels of the image sensor 2.

The image recording unit 8 includes a detachable memory or the like. The image recording unit 8 is controlled by a control signal from the synchronization control unit 10 to record image data or an output signal converted into a digital signal and sent from the signal processing unit 5 or read out data from the detachable memory.

The operation unit 9 transmits an external instruction input using an operation member such as a switch, a push button, a lever, or a dial to the synchronization control unit 10. Examples of the external instruction are the state of the power switch of the image capture apparatus, the state of a push button to instruct photographing, the state of a button or lever to instruct optical zooming or electronic zooming, and the state of a mode dial to select a photographing mode. The operation unit 9 also transmits an instruction to display an image before photographing, various instructions for photographing, a menu operation to instruct photographed image display or an operation of the image capture apparatus in advance, and the like to the synchronization control unit 10. The operation unit 9 can also display the state of the image capture apparatus using a display device such as an LCD or an LED or the image display unit 7 in accordance with a control signal from the synchronization control unit 10. An on-screen operation may be performed using the image display unit 7 as a display device and a touch panel attached to the image display unit 7 as an operation member.

The synchronization control unit 10 controls the entire image capture apparatus in accordance with an instruction from the operation unit 9. The synchronization control unit 10 controls the optical system 1 based on photometric data such as an in-focus state or an exposure amount sent from the signal processing unit 5 so as to form an optimum object image on the image sensor 2. The synchronization control unit 10 can also detect the use state of the memory unit 6 and the attached state or use state of the memory of the image recording unit 8.

Figure 2:
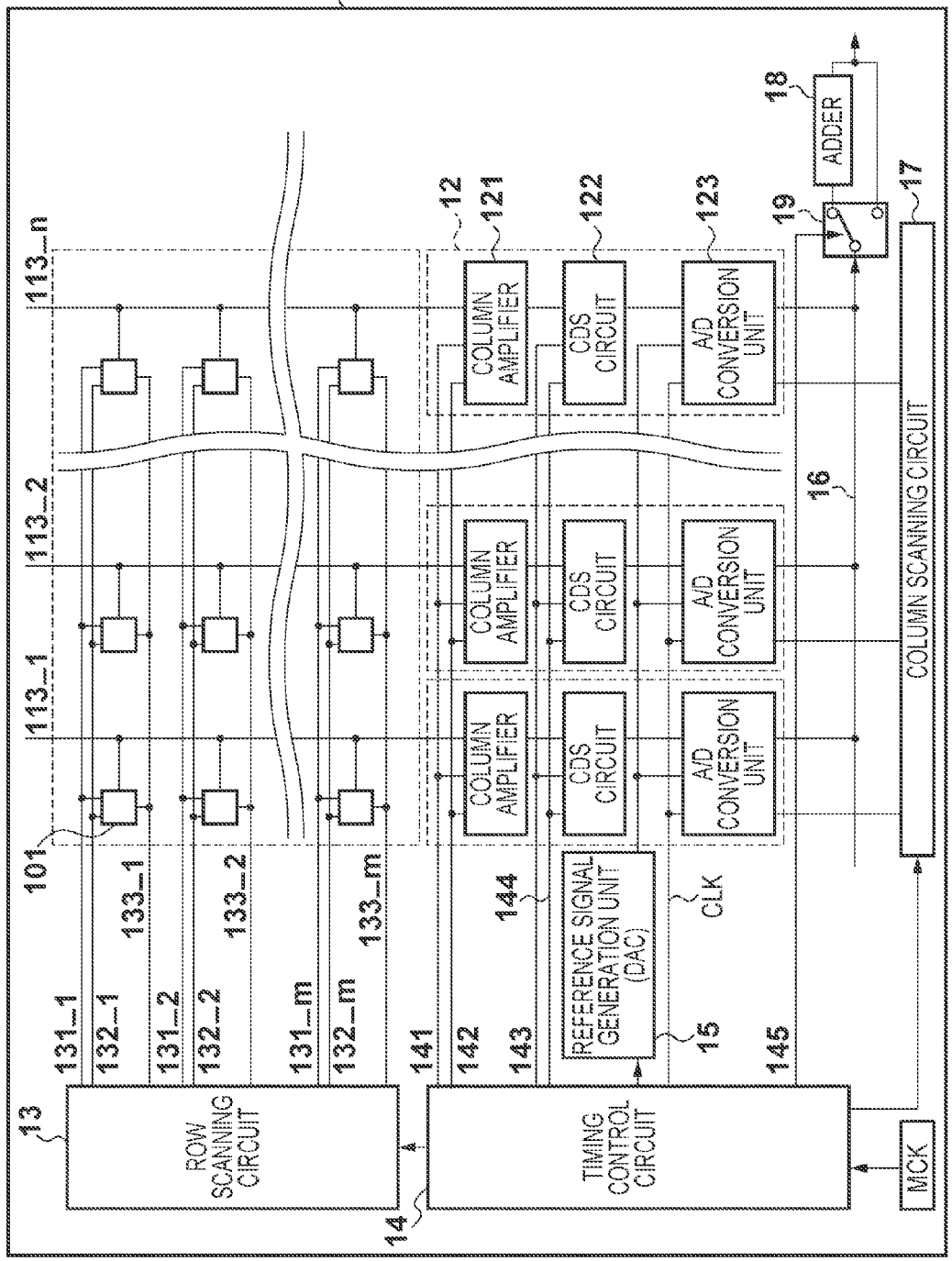
FIG. 2 is a block diagram of an image sensor according to the embodiment of the present invention.

FIG. 2 is a block diagram showing the arrangement of a CMOS image sensor. As shown in FIG. 2, an image sensor 100 includes a plurality of pixel sections (unit pixels) 101 arranged (two-dimensionally arranged) on its light receiving surface in a matrix of M rows×N columns in the row and column directions. Each pixel section 101 includes a photoelectric conversion element that converts incident light into charges. A color filter array in which color filters R (red), Gr and Gb (green), and B (blue) are arrayed in a Bayer arrangement is provided on the front surfaces of the pixel sections 101. M is a natural number of 1 to m, and N is a natural number of 1 to n. The image sensor 100 includes column signal lines (vertical signal lines) 113 that output, in the column direction (vertical direction), image signals (analog signals) corresponding to charges generated in the pixel sections 101 on the column basis, column amplifier units 121 provided on the column basis, CDS (Correlated Double Sampling) circuits 122 provided on the column basis, and A/D conversion units (A/D converters) 123 provided on the column basis. The A/D conversion unit 123 converts an image signal that is an analog signal into a digital signal on the column basis. A column scanning circuit (second scanning unit) 17 sequentially outputs the digital signals converted by the A/D conversion units 123 via a row signal line (horizontal signal line) 16.

The image capture apparatus according to this embodiment includes a photographing optical system including an image capture lens that forms an image of incident light on the imaging plane, a stop, and a shutter, and the synchronization control unit 10 that controls exposure of the image sensor 100 provided on the imaging plane of the image capture lens included in the optical system 1 using the stop and shutter and also controls image capture and image signal output via the driving circuit unit 3 serving as a timing generator.

A row scanning circuit (first scanning unit) 13 of the image sensor 100 receives a control signal from a timing control circuit 14 and outputs a timing signal to read the image signal output from each pixel section 101 to the column signal line 113 of the corresponding column for each row.

A reference signal generation unit 15 includes an digital-analog converter (hereinafter, DAC). The reference signal generation unit 15 receives a control signal from the timing control circuit 14 and generates a reference signal voltage which has a stepwise wave form by varying time. The reference signal generated by the reference signal generation unit 15 is input to an A/D conversion unit 123. The A/D conversion unit 123 compares a voltage of an arbitrary column signal line 113 and the reference signal generated by the reference signal generation unit 15 and converts the analog signal to the digital signal by counting time from a timing when the comparison is started to a timing when the reference signal voltage becomes equal to the voltage of the column signal line 113 by a counter arranged in the A/D conversion unit 123.

Figure 3:
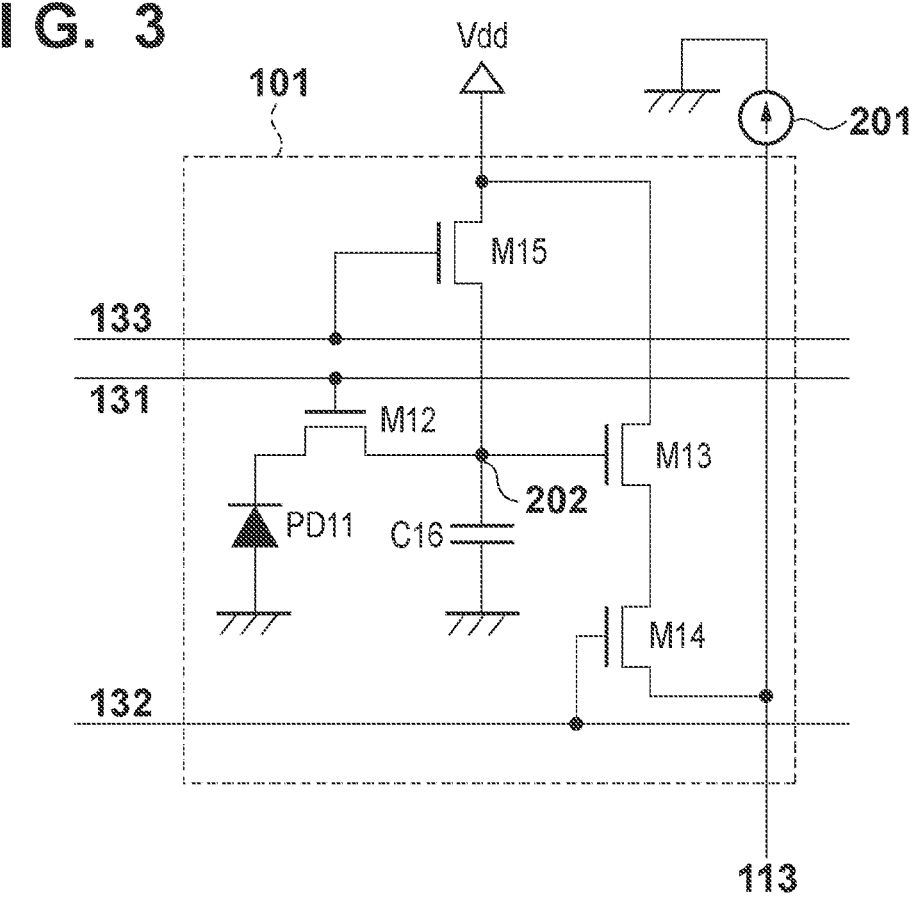
FIG. 3 is a circuit diagram of a pixel section 101.

FIG. 3 is a circuit diagram showing the circuit arrangement of the pixel section 101. As shown in FIG. 3, the pixel section 101 includes a photodiode PD11, a transfer transistor M12, an amplification transistor M13, a select transistor M14, and a reset transistor M15. For example, an n-channel MOSFET (MOS Field-Effect Transistor) is used as each transistor.

Signal lines to transmit a transfer signal 131, a row selection signal 132, and a reset control signal 133 are connected to the gates of the transfer transistor M12, the select transistor M14, and the reset transistor M15, respectively. These signal lines extend in the horizontal direction to simultaneously drive the pixels included in the same row and thus enable to control the operation of a rolling shutter of line-sequentially operating type or a global shutter of all rows simultaneously operating type. The column signal line 113 is connected to the source of the select transistor M14. One end of the column signal line 113 is grounded via a constant current source 201.

The photodiode PD11 accumulates charges generated by photoelectric conversion. The P side is grounded, and the N side is connected to the source of the transfer transistor M12. When the transfer transistor M12 is turned on, the charges are transferred from the photodiode PD11 to an FD portion 202. The FD portion 202 has a parasitic capacitance C16, and the charges are accumulated in this portion.

The amplification transistor M13 has a drain connected to a power supply voltage Vdd and a gate connected to the FD portion 202. The amplification transistor M13 converts the voltage of the FD portion 202 into an electrical signal. The select transistor M14 is used to select a pixel to read a signal for each row, and has a drain connected to the source of the amplification transistor M13 and a source connected to the column signal line 113. When the select transistor M14 is turned on, the amplification transistor M13 and the constant current source 201 form a source follower so that a voltage corresponding to the voltage of the FD portion 202 is output to the column signal line 113. The reset transistor M15 has a drain connected to the power supply voltage Vdd and a source connected to the FD portion 202. The reset transistor M15 resets the voltage of the FD portion 202 to the power supply voltage Vdd.

The basic operation of the pixel section 101 will be described below. First, the reset timing is calculated from a set charge accumulation time. At the calculated reset timing, the reset control signal 133 for each pixel of the read start row of the pixel sections 101 is set to a high potential to turn on the reset transistor M15. Next, the transfer signal 131 is set to the high potential to turn on the transfer transistor M12.

The FD portion 202 and the photodiode PD11 are thus reset. The transfer signal 131 is then set to a low potential to turn off the transfer transistor M12, thereby starting charge accumulation in the photodiode PD11. The reset control signal 133 is then set to the low potential to turn off the reset transistor M15.

After that, immediately before the end of charge accumulation, the reset control signal 133 of the read start row is set to the high potential to turn on the reset transistor M15, thereby resetting the FD portion 202 to the power supply voltage Vdd.

In this state, the row selection signal 132 of the read start row is set to the high potential to turn on the select transistor M14. After that, the reset control signal 133 is set to the low potential to turn off the reset transistor M15, thereby outputting a reset signal corresponding to the voltage of the FD portion 202 at this time to the column signal line 113.

Next, the transfer signal 131 is set to the high potential to turn on the transfer transistor M12, thereby transferring the charges generated in the photodiode PD11 to the FD portion 202. The transfer signal 131 is then set to the low potential to turn off the transfer transistor M12. The charge accumulation thus ends, and an image signal corresponding to a voltage to which the charges transferred to the FD portion 202 are added is output to the column signal line 113.

Next, the image signal and the reset signal output from the pixel section 101 of each row to the column signal line 113 are input to a column processing unit 12. In the column processing unit 12, the column amplifier unit (column amplifier) 121 amplifies the image signal as an analog signal output to the column signal line 113. The CDS circuit 122 then subtracts the reset signal from the image signal. The A/D conversion unit 123 converts the image signal output from the CDS circuit 122, from which the reset component has been removed, from an analog signal into a digital signal.

Figure 4:
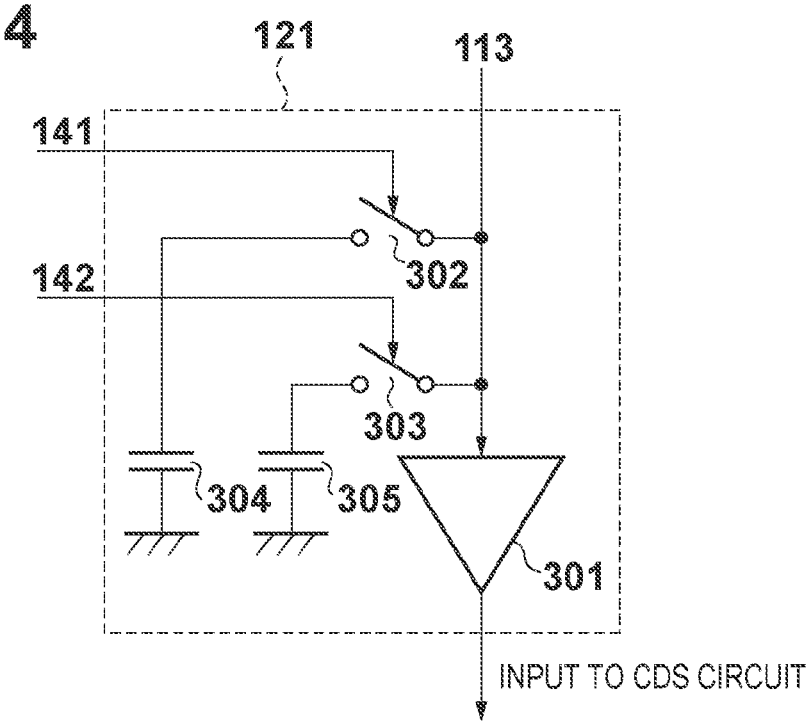
FIG. 4 is an internal circuit diagram of a column amplifier.

FIG. 4 is a circuit diagram showing the arrangement of the column amplifier unit according to this embodiment. The column amplifier unit 121 includes an amplifier 301 connected to the column signal line 113, and switches 302 and 303 each having one terminal connected to the column signal line 113. The column amplifier unit 121 also includes capacitors 304 and 305 each having one terminal connected to the other terminal of a corresponding one of the switches 302 and 303 and the other terminal grounded. The switches 302 and 303 are on/off-controlled by addition control signals 141 and 142 from the timing control circuit 14. That is, the column amplifier unit 121 incorporates a function of adding, in the column direction, the analog signals of a plurality of rows output to the column signal line 113.

The addition control signals 141 and 142 are synchronous with the row selection signal 132. The image capture apparatus of this embodiment switches between an addition mode and a non-addition mode to be described later based on a photographing mode set by the user. For example, when a photographing mode that needs a high-resolution image such as a normal still image or a high-resolution moving image is designated, the non-addition mode to be described later is set. The image sensor 100 is driven by non-addition driving so as to sequentially selectively output the signals of the pixel sections 101. When an instruction to change to a photographing mode with placing on the frame rate is input, the mode is switched to the addition mode in order to increase the frame rate by a data compression effect obtained by adding the signals of a plurality of pixels.

On the other hand, switching between the addition mode and the non-addition mode may be done based on the noise amount in the output signal of the image sensor. More specifically, when the noise amount in the output signal of the image sensor 100 increases, the addition mode is set to drive the image sensor 100 by addition driving to amplify its output signal, thereby suppressing the increase in random noise by the averaging effect. If the noise amount in the output signal of the image sensor 100 is not so large, the non-addition mode is set to perform control to drive the image sensor 100 by non-addition driving.

When the addition mode is set, the signals output from two different rows in the column direction (vertical direction) are averaged. That is, the signals output from the pixels of odd-numbered rows are averaged, and the signals output from the pixels of even-numbered rows are averaged. When reading signals from the pixels of an mth row, the switch 302 is turned on by the addition control signal 141, and the switch 303 is turned off by the addition control signal 142, thereby accumulating the signals of the mth row in the capacitor 304. When reading signals from the pixels of an (m+2)th row, the switch 302 is turned off by the addition control signal 141, and the switch 303 is turned on by the addition control signal 142, thereby accumulating the signals of the (m+2)th row in the capacitor 305. After the signals are accumulated in the capacitors, both the switches 302 and 303 are turned on to cause the amplifier 301 to amplify the averaged signal and output it to the CDS circuit 122. Note that the averaging processing of the signals read from the pixels of the plurality of rows is performed not only for the image signal but also for the reset signal. Details of the timing of the averaging processing in the column amplifier unit 121 will be described later.

Figure 5:
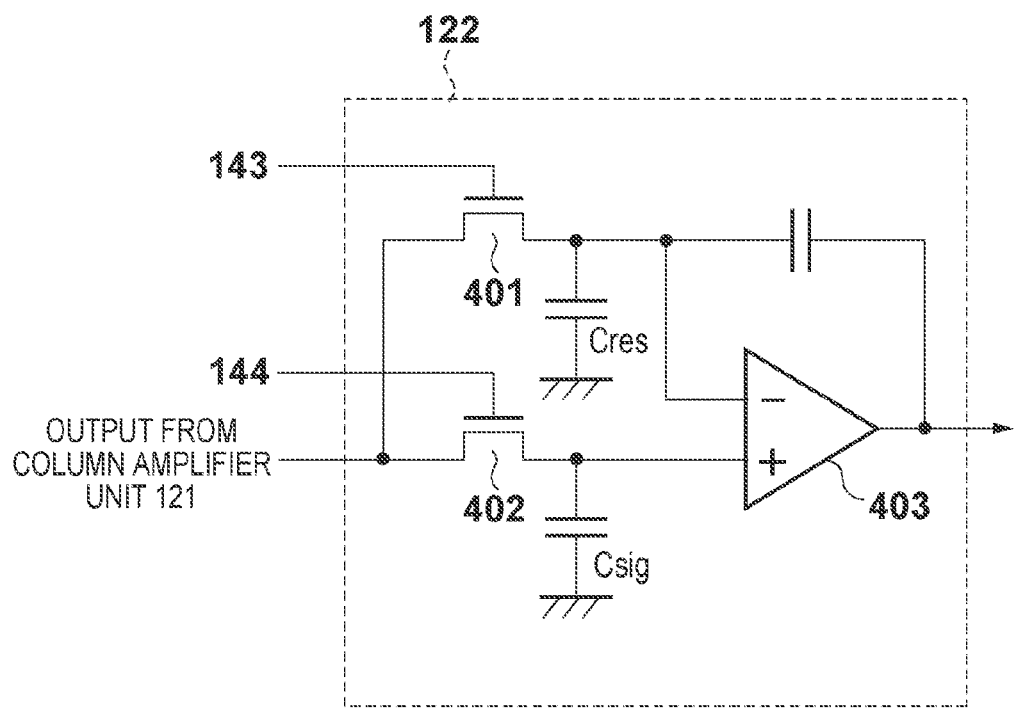
FIG. 5 is a block diagram of a CDS circuit.

The image signal and the reset signal which are averaged by the column amplifier unit 121 are input to the CDS circuit 122 shown in FIG. 5. Switches 401 and 402 are on/off-controlled by CDS control signals 143 and 144 sent from the timing control circuit 14. The image signal and the reset signal are time-divisionally input to capacitors Csig and Cres, respectively. The CDS circuit 122 outputs the image signal from which the reset signal component has been removed to the A/D conversion unit 123 via an OP amplifier 403. Note that a switching element such as an FET transistor is used as each of the switches 401 and 402.

The image signal that is the analog signal output from the CDS circuit 122 is converted into a digital signal by the A/D conversion unit 123 and output for each column to the row signal line (horizontal signal line) 16 in accordance with a timing signal supplied from the column scanning circuit 17.

The digital signal output from the column processing unit 12 is output to the row signal line (horizontal signal line) 16 by the column scanning circuit 17. When the non-addition mode is selected for, for example, a still image, the signal is externally output without intervening an adder (second addition unit) 18. When the addition mode is selected to obtain a high S/N ratio, a switch 19 is connected to intervene the adder 18. That is, switching is performed such that the digital signals of a plurality of columns are externally output after being added via the adder 18 in the row direction (horizontal direction), or the digital signals of a plurality of columns are directly output in the row direction (horizontal direction) without being added via the adder 18.

In this embodiment, when adding the signals output from the plurality of pixels in the column direction (vertical direction) and the row direction (horizontal direction), analog averaging processing in the column direction (vertical direction) in the column amplifier unit 121 and digital averaging processing in the row direction (horizontal direction) after digital conversion of the signals output to the column signal line 113 are performed. FIG. 6 is a timing chart for explaining the timing of each processing in the addition mode. The timing of processing in the addition mode will be described below with reference to FIG. 6. Referring to FIG. 6, VS is a vertical synchronization signal representing one frame period, and HS is a horizontal synchronization signal representing one horizontal scanning period.

In FIG. 6, after the horizontal synchronization signal HS rises, the reset control signals 133(1) and 133(3) (neither are shown in FIG. 6) are set to the high potential to turn on the reset transistor M15 of each pixel shown in FIG. 2. In addition, the row selection signals 132(1) and 132(3) are set to the high potential to turn on the select transistor M14 of each pixel, thereby sequentially executing read of the reset signals of the first and third rows from the FD portions 202 to the column signal line (t1 to t2). At this time, the addition control signals 141 and 142 operate in synchronism with the row selection signals 132(1) and 132(3), respectively.

From t2 to t3, the reset signals of the first and third rows are averaged. More specifically, the addition control signals 141 and 142 are simultaneously turned on to connect the capacitors 304 and 305 in the column amplifier unit 121 in parallel to the column signal line 113, thereby performing the averaging processing.

From t3 to t4, the CDS control signal 143 is set to the high potential to turn on the switch 401, thereby accumulating the averaged reset signal in the capacitor Cres of the CDS circuit 122. From t4 to t5, the transfer signals 131(1) and 131(3) (neither are shown in FIG. 6) are set to the high potential to turn on the transfer transistor M12 of each pixel shown in FIG. 2, thereby transferring charges from the photodiode PD11 to the FD portion 202. In addition, the row selection signals 132(1) and 132(3) are set to the high potential to turn on the select transistor M14 of each pixel, thereby sequentially executing read of an image signal corresponding to the charges transferred to the FD portion to the column signal line. At this time, the addition control signals 141 and 142 operate in synchronism with the row selection signals 132(1) and 132(3), respectively, like from t1 to t2.

From t5 to t6, the image signals of the first and third rows are averaged. More specifically, like from t2 to t3, the addition control signals 141 and 142 are simultaneously turned on to connect the capacitors 304 and 305 in the column amplifier unit 121 in parallel to the column signal line 113, thereby performing the averaging processing.

From t6 to t7, the CDS control signal 144 is set to the high potential to turn on the switch 402, thereby accumulating the averaged image signal in the capacitor Csig of the CDS circuit 122. The image signal from which the reset signal component has been removed is output from the OP amplifier 403 to the A/D conversion unit 123.

From t7, the A/D conversion unit 123 converts the image signal that has undergone CDS processing into a digital signal. At this time, the image signal converted into a digital signal and averaged in the column direction (vertical direction) is output to the row signal line 16 in accordance with the next horizontal synchronization signal HS (the timing the read and averaging operation of the signals of the second and fourth rows is performed).

To perform addition processing in the row direction (horizontal direction) for the digital signals read to the row signal line 16 before output from the image sensor, an addition control signal 145 is set to the high potential so that the switch 19 is connected to input the signals to the adder 18, and addition processing in the row direction (horizontal direction) is performed. At this time, since the image signal is digitized, the data does not degrade even at a higher transfer frequency. It is therefore possible to prevent a decrease in the data transfer rate by raising the driving frequency of the column scanning circuit 17.

As described above, according to this embodiment, the column amplifier unit 121 executes addition processing in the column direction (vertical direction) for image signals that are still analog signals. At the time of transfer in the row direction (at the time of horizontal transfer) after a signal is converted into a digital signal, the signals of a plurality of columns, which are digital signals, are sequentially added in the row direction (horizontal direction). This allows to perform the addition operation for arbitrary pixels while suppressing the circuit scale. In addition, when the analog image signal after addition in the column direction (vertical direction) is A/D-converted, the A/D conversion processing time can be shortened as compared to a case in which digital addition is performed after the A/D conversion operation is performed on the pixel basis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-144551, filed Jun. 29, 2011, and No. 2012-121391, filed May 28, 2012, which are hereby incorporated by reference herein in their entirety.

What is claimed is:

1. An image sensor comprising:
pixel sections each including a photoelectric conversion element which converts incident light into charges, the pixel sections corresponding to unit pixels which are two-dimensionally arranged in a row direction and a column direction and generate analog signals corresponding to the charges;
a column signal line configured to output the analog signals generated in said pixel sections in the column direction;
a first addition unit which adds, in the column direction, analog signals of a plurality of rows output to said column signal line;
an A/D converter which converts the analog signal amplified by a column amplifier into a digital signal for each column;
a row signal line configured to output the digital signal converted by said A/D converter in the row direction;
a second addition unit which adds, in the row direction, digital signals of a plurality of columns output to said row signal line; and
a first scanning unit which reads analog signals generated in said pixel sections of an arbitrary row to said column signal line.

2. The sensor according to claim 1, wherein said first addition unit adds, in the column direction, the analog signals of the arbitrary row read by said first scanning unit.

3. The sensor according to claim 1, further comprising a second scanning unit which reads the digital signal converted by said A/D converter to said row signal line, said second scanning unit reading digital signals of an arbitrary column from said A/D converter.

4. The sensor according to claim 3, wherein said second addition unit adds, in the row direction, signals of an arbitrary column read by said second scanning unit.

5. The sensor according to claim 1, further comprising an amplification unit which amplifies the analog signal output to said column signal line,
wherein said first addition unit is incorporated in said amplification unit.

6. An image capture apparatus comprising:
an image sensor including pixel sections each including a photoelectric conversion element which converts incident light into charges, the pixel sections corresponding to unit pixels which are two-dimensionally arranged in a row direction and a column direction and generate analog signals corresponding to the charges, a column signal line configured to output the analog signals generated in said pixel sections in the column direction, a first addition unit which adds, in the column direction, analog signals of a plurality of rows output to said column signal line, an A/D converter which converts the analog signal amplified by a column amplifier into a digital signal for each column, a row signal line configured to output the digital signal converted by said A/D converter in the row direction, a second addition unit which adds, in the row direction, digital signals of a plurality of columns output to said row signal line, and a first scanning unit which reads analog signals generated in said pixel sections of an arbitrary row to said column signal line;
a driving unit which drives said image sensor;
a signal processing unit which performs predetermined signal processing for an output signal of said image sensor; and
a control unit which controls said driving unit and said signal processing unit,
wherein said control unit controls said driving unit by one of addition driving in which addition by said first addition unit and said second addition unit is performed and non-addition driving in which addition by said first addition unit and said second addition unit is not performed.

7. The apparatus according to claim 6, wherein said control unit switches between the addition driving and the non-addition driving based on a photographing mode.

8. The apparatus according to claim 6, wherein said control unit switches between the addition driving and the non-addition driving based on a noise amount in the output signal of said image sensor.

9. The apparatus according to claim 6, wherein said first addition unit adds, in the column direction, the analog signals of the arbitrary row read by said first scanning unit.

10. The apparatus according to claim 6, further comprising a second scanning unit which reads the digital signal converted by said A/D converter to said row signal line, said second scanning unit reading digital signals of an arbitrary column from said A/D converter.

11. The apparatus according to claim 10, wherein said second addition unit adds, in the row direction, signals of an arbitrary column read by said second scanning unit.

12. The apparatus according to claim 6, further comprising an amplification unit which amplifies the analog signal output to said column signal line,
wherein said first addition unit is incorporated in said amplification unit.

13. An image sensor comprising:
pixel sections each including a photoelectric conversion element which converts incident light into charges, the pixel sections corresponding to unit pixels which are two-dimensionally arranged in a row direction and a column direction and generate analog signals corresponding to the charges;
an analog signal mixing unit which mixes, in the column direction, analog signals of a plurality of rows;
an A/D converter which converts the analog signal into a digital signal for each column; and
a digital signal addition unit which adds, in the row direction, digital signals of a plurality of columns converted by said A/D converter.

14. The sensor according to claim 13, further comprising a column signal line configured to output the analog signals in the column direction; and
a first scanning unit which reads analog signals generated in said pixel sections of an arbitrary row to said column signal line,
wherein said analog signal mixing unit mixes, in the column direction, the analog signals of the arbitrary row read by said first scanning unit.

15. The sensor according to claim 13, further comprising a row signal line configured to output the digital signal converted by said A/D converter in the row direction; and
a second scanning unit which reads the digital signal to said row signal line,
wherein said second scanning unit reading digital signals of an arbitrary column from said A/D converter.

16. The sensor according to claim 15, wherein said digital signal addition unit adds, in the row direction, signals of an arbitrary column read by said second scanning unit.

17. The sensor according to claim 13, further comprising an amplification unit which amplifies the analog signal output to said column signal line,
wherein said first addition unit is incorporated in said amplification unit.

18. An image capture apparatus comprising:
an image sensor including pixel sections each including a photoelectric conversion element which converts incident light into charges, the pixel sections corresponding to unit pixels which are two-dimensionally arranged in a row direction and a column direction and generate analog signals corresponding to the charges, an analog signal mixing unit which mixes, in the column direction, an A/D converter which converts the analog signal into a digital signal for each column, and a digital signal addition unit which adds, in the row direction, digital signals of a plurality of columns converted by said A/D converter, and;
a driving unit which drives said image sensor;
a signal processing unit which performs predetermined signal processing for an output signal of said image sensor; and
a control unit which controls said driving unit and said signal processing unit,
wherein said control unit controls said driving unit by one of addition driving in which mixing by said analog signal mixing unit and addition by said digital signal addition unit is performed and non-addition driving in which mixing by said analog signal mixing unit and addition by said digital signal addition unit is not performed.

19. The apparatus according to claim 18, wherein said control unit switches between the addition driving and the non-addition driving based on a photographing mode.

20. The apparatus according to claim 18, wherein said control unit switches between the addition driving and the non-addition driving based on a noise amount in the output signal of said image sensor.

21. The apparatus according to claim 18, wherein said image sensor further comprising a column signal line configured to output the analog signals generated in said pixel sections in the column direction; and
a first scanning unit which reads analog signals generated in said pixel sections of an arbitrary row to said column signal line, and
wherein said analog signal mixing unit mixes, in the column direction, the analog signals of the arbitrary row read by said first scanning unit.

22. The apparatus according to claim 18, wherein said image sensor further comprising a row signal line configured to output the digital signal converted by said A/D converter in the row direction; and
a second scanning unit which reads the digital signal to said row signal line, and
wherein said second scanning unit reading digital signals of an arbitrary column from said A/D converter.

23. The apparatus according to claim 22, wherein said digital addition unit adds, in the row direction, signals of an arbitrary column read by said second scanning unit.

24. The apparatus according to claim 18, wherein said image sensor further comprising an amplification unit which amplifies the analog signal output to said column signal line, and
wherein said analog signal mixing unit is incorporated in said amplification unit.

* * * * *